(12) United States Patent
Ogiwara et al.

(10) Patent No.: US 10,890,296 B2
(45) Date of Patent: Jan. 12, 2021

(54) HIGH PRESSURE TANK DEVICE AND METHOD OF DETECTING LEAKAGE IN HIGH PRESSURE TANK DEVICE

(71) Applicant: HONDA MOTOR CO., LTD., Tokyo (JP)

(72) Inventors: Naoki Ogiwara, Wako (JP); Satoru Kawase, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 245 days.

(21) Appl. No.: 16/108,187

(22) Filed: Aug. 22, 2018

(65) Prior Publication Data
US 2019/0063686 A1    Feb. 28, 2019

(30) Foreign Application Priority Data

Aug. 24, 2017 (JP) ................. 2017-160906

(51) Int. Cl.
*F17C 13/02* (2006.01)
*F17C 1/04* (2006.01)
(Continued)

(52) U.S. Cl.
CPC .............. *F17C 13/02* (2013.01); *F17C 1/00* (2013.01); *F17C 1/04* (2013.01); *F17C 13/084* (2013.01);
(Continued)

(58) Field of Classification Search
CPC ........ G01M 3/329; G01M 3/36; G01M 3/363; G01M 3/3272; G01M 3/26; G01M 3/04;
(Continued)

(56) References Cited

U.S. PATENT DOCUMENTS 10,641,433 B2 *  5/2020  Ogiwara .......... B60K 15/03006
2008/0099075 A1 *  5/2008  Martrich ............... F17C 13/123
                                                              137/312
(Continued)

FOREIGN PATENT DOCUMENTS

JP      2003-172500       6/2003
JP      2003172500 A *    6/2003
(Continued)

OTHER PUBLICATIONS

Japanese Office Action for Japanese Patent Application No. 2017-160906 dated Apr. 9, 2019.

*Primary Examiner* — John Fitzgerald
*Assistant Examiner* — Truong D Phan
(74) *Attorney, Agent, or Firm* — Amin, Turocy & Watson, LLP

(57) ABSTRACT

A high pressure tank device includes a high pressure tank configured to supply/discharge a fluid through a supply/discharge channel, a first storage part, a leakage detection sensor provided in the first storage part for detecting leakage of the fluid, and a second storage part. The high pressure tank includes a resin liner, a reinforcement layer which covers an outer surface of the liner, and a cap having a supply/discharge hole. The first storage part can store a first fluid. The first fluid is at least one of the fluid that leaked from the supply/discharge channel and the fluid that leaked through the inside of the supply/discharge hole. The second storage part is provided independently from the first storage part, and can store a second fluid. The second fluid is the fluid that leaked from the outside of the supply/discharge hole.

6 Claims, 5 Drawing Sheets

(51) Int. Cl.
*F17C 1/00* (2006.01)
*F17C 13/08* (2006.01)
*G01M 3/32* (2006.01)
*G01M 3/28* (2006.01)

(52) U.S. Cl.
CPC ........ *G01M 3/2815* (2013.01); *G01M 3/2853* (2013.01); *G01M 3/329* (2013.01); *G01M 3/3236* (2013.01); *G01M 3/3272* (2013.01); *F17C 2201/0109* (2013.01); *F17C 2201/056* (2013.01); *F17C 2203/0604* (2013.01); *F17C 2203/066* (2013.01); *F17C 2203/0619* (2013.01); *F17C 2203/0663* (2013.01); *F17C 2205/0111* (2013.01); *F17C 2205/0305* (2013.01); *F17C 2221/012* (2013.01); *F17C 2223/0123* (2013.01); *F17C 2223/036* (2013.01); *F17C 2250/032* (2013.01); *F17C 2250/0452* (2013.01); *F17C 2260/037* (2013.01); *F17C 2260/038* (2013.01); *F17C 2270/0184* (2013.01); *F17C 2270/0763* (2013.01)

(58) Field of Classification Search
CPC .............. G01M 3/3236; G01M 3/2853; G01M 3/2815; G01M 3/32; G01M 3/366; G01M 3/243; G01M 3/24; G01M 3/2807; F17C 13/02; F17C 13/084; F17C 1/00; F17C 1/04; F17C 1/16; F17C 2201/0109; F17C 2201/056; F17C 2203/0604; F17C 2203/0619; F17C 2203/066; F17C 2203/0663; F17C 2205/0111; F17C 2205/0305; F17C 2221/012; F17C 2223/0123; F17C 2223/036; F17C 2250/032; F17C 2250/0452; F17C 2260/037; F17C 2260/038; F17C 2270/0184; F17C 2270/0763; F17C 7/02; E21B 47/1025; Y10T 137/0452; Y10T 137/5762; B60K 2015/03315; H01M 8/04059; D06F 39/081; F24H 9/165; B67D 7/3209

USPC ......... 73/49.3, 52, 40, 40.5 R, 45.4; 702/51; 137/312

See application file for complete search history.

(56) References Cited

U.S. PATENT DOCUMENTS

2012/0291878 A1\* 11/2012 Pisot .................. F17C 1/06
137/315.01
2019/0277453 A1\* 9/2019 Ogiwara .......... B60K 15/03177

FOREIGN PATENT DOCUMENTS

JP 2015-155736 8/2015
JP 2016-183687 10/2016

\* cited by examiner

HIGH PRESSURE TANK DEVICE AND METHOD OF DETECTING LEAKAGE IN HIGH PRESSURE TANK DEVICE

CROSS-REFERENCE TO RELATED APPLICATION

This application is based upon and claims the benefit of priority from Japanese Patent Application No. 2017-160906 filed on Aug. 24, 2017, the contents of which are incorporated herein by reference.

BACKGROUND OF THE INVENTION

Field of the Invention

The present invention relates to a high pressure tank device including a high pressure tank for supplying/discharging a fluid through a supply/discharge channel. Further, the present invention relates to a method of detecting leakage in the high pressure tank device.

Description of the Related Art

High pressure tank devices including a high pressure tank for supplying/discharging a fluid through a supply/discharge channel are known. The high pressure tank includes a resin liner capable of storing the fluid inside, a reinforcement layer such as fiber reinforced plastic for covering an outer surface of the linear, and a cap having a supply/discharge hole for supplying/discharging the fluid into/from the linear. For example, an insert member is inserted into the supply/discharge hole. A pipe, etc. forming the supply/discharge channel is connected to the insert member, and/or a valve, etc., for opening/closing the pipe is provided in the insert member.

In general, the high pressure tank device of this type has a structure for detecting the leakage of fluid from the supply/discharge channel and/or the high pressure tank in the event that abnormality occurs in the high pressure tank device, for example. Then, in the case where leakage of the fluid is detected, for example, actions such as operation to stop supplying/discharging the fluid by closing the valve are taken. In the high pressure tank device, it is expected that leakage of the fluid occurs mainly at a position between the insert member and the supply/discharge hole, and at the connection between the pipe and the insert member, etc. Therefore, examples of the structure capable of detecting leakage of the fluid include a storage part surrounding the cap and the connection for storing the leaked fluid, and a sensor for detecting the fluid in the storage part.

In this regard, for example, as described, e.g., in Japanese Laid-Open Patent Publication No. 2015-155736, in a high pressure tank including a resin liner, fluid may pass through the liner, and enter, e.g., a gap between an outer surface of the liner and a reinforcement layer (hereinafter also referred to as a covered portion).

The quantity of fluid which passes through the linear and enters the covered portion is limited. Therefore, as part of the normal operation of the high pressure tank device, for example, the leaked fluid may be guided through an opening of the reinforcement layer, provided for exposure of the cap, and collected. That is, the fluid which passes through the liner and leaks out of the high pressure tank during normal operation of the high pressure tank device is different from the fluid which leaks due to abnormality occurring in the high pressure tank device.

SUMMARY OF THE INVENTION

However, in the high pressure tank device provided with the storage part and the sensor as structure capable of detecting abnormality, the fluid leaking during normal operation and the fluid leaking when abnormality occurs are stored altogether in the storage part. As a result, there is a concern that, even during normal operation of the high pressure tank device, a leakage may be detected erroneously as resulting from abnormality.

A main object of the present invention is to provide a high pressure tank device capable of highly accurately detecting leakage of a fluid when abnormality occurs.

Another object of the present invention is to provide a method of detecting leakage of the above high pressure tank device.

According to an embodiment of the present invention, a high pressure tank device including a high pressure tank configured to supply/discharge a fluid through a supply/discharge channel is provided. The high pressure tank includes a resin liner configured to store the fluid inside, a reinforcement layer configured to cover an outer surface of the liner, and a cap. A supply/discharge hole configured to supply/discharge the fluid to/from the liner is formed inside the cap. The high pressure tank device further includes a first storage part configured to store a first fluid as at least one of the fluid that leaked from the supply/discharge channel and the fluid that leaked to an outside of the high pressure tank through an inside of the supply/discharge hole, a leakage detection sensor provided in the first storage part and configured to detect leakage of the fluid, and a second storage part provided independently from the first storage part and configured to store a second fluid as the fluid that leaked from an outside of the supply/discharge hole to the outside of the high pressure tank.

In the high pressure tank device, the first storage part which stores the first fluid and the second storage part which stores the second fluid are provided independently from each other. The first fluid is at least one of the fluid that leaked from the supply/discharge channel and the fluid that leaked from the high pressure tank through the inside of the supply/discharge hole. In other words, the first fluid is fluid which leaked due to occurrence of abnormality in the high pressure tank device, from a position which is intended not to cause leakage of the fluid during normal operation of the high pressure tank device.

The second fluid is fluid which leaked from the outside of the supply/discharge hole to the outside of the high pressure tank. That is, for example, the second fluid includes the fluid which passed through the liner, entered a gap between an outer surface of the liner and the reinforcement layer, and leaked temporarily through an opening, etc. of the reinforcement layer, and the fluid which passed through both of the liner and the reinforcement layer and leaked slightly, during normal operation of the high pressure tank device.

Therefore, in the high pressure tank device, it is possible to store the first fluid in the first storage part separately from the second fluid, and detect the first fluid by the leakage detection sensor. In this manner, it is possible to avoid erroneous detection that leakage has occurred due to abnormality, during normal operation of the high pressure tank device. As a result, it is possible to highly accurately detect leakage due to abnormality occurring in the high pressure tank device.

In the above high pressure tank device, preferably, the cap includes a liner facing surface configured to face an outer surface of the liner, an outer circumferential surface configured to face an inside of the second storage part, a passage opening in the liner facing surface and the outer circumferential surface, and configured to connect a gap between the outer surface of the liner and the reinforcement layer, and the second storage part.

In this case, it is possible to suitably guide the fluid which entered the gap between the outer surface of the liner and the reinforcement layer into the second storage part through the passage. Thus, it is possible to effectively suppress stagnation of the fluid between the outer surface of the liner and the reinforcement layer. Accordingly, it is possible to avoid occurrence of buckling, etc., and improve the durability of the high pressure tank.

Preferably, the above high pressure tank device further includes a concentration sensor provided inside the second storage part and configured to detect a concentration of the fluid. For example, in the case where the connection between the cap and the liner is provided inside the supply/discharge hole, a seal member is provided between the inner surface of the supply/discharge hole and the outer surface of the liner. If abnormality occurs in the seal member, the fluid enters from the supply/discharge hole toward the outer surface of the liner, and the fluid leaks, e.g., from an opening of the reinforcement layer. This fluid is also included in the second fluid which leaks from the outside of the supply/discharge hole. As described above, also in the case where the fluid that leaked due to abnormality in the high pressure tank device is included in the second fluid, it is possible to detect the leakage by providing the concentration sensor in the second storage part.

Specifically, during normal operation of the high pressure tank device, in the case where the fluid passes through the linear, enters the gap between the outer surface of the liner and the reinforcement layer, and leaks through the opening, etc., of the reinforcement layer, this leakage occurs temporarily, and the quantity of the leaked fluid is limited. Further, in the case where the fluid leaks by passing through both of the liner and the reinforcement layer, the quantity of the leaked fluid is limited and small. Therefore, for example, when the concentration of the second fluid detected by the concentration sensor exceeds a predetermined concentration, or when the concentration of the second fluid detected by the concentration sensor exceeds a predetermined concentration continuously for a predetermined period, it is possible to determine that leakage has occurred due to abnormality in the high pressure tank device. As a result, it becomes possible to detect leakage of the fluid due to abnormality further accurately.

According to another embodiment of the present invention, a method of detecting leakage of a fluid in a high pressure tank device is provided. The method detects leakage of the fluid in the high pressure tank device which supplies/discharges the fluid to/from a high pressure tank through a supply/discharge channel. In the method, the high pressure tank includes a resin liner configured to store the fluid inside, a reinforcement layer configured to cover an outer surface of the liner, and a cap. A supply/discharge hole configured to supply/discharge the fluid to/from the liner is formed inside the cap. In the method, a first fluid as at least one of the fluid that leaked from the supply/discharge channel to an outside of the supply/discharge channel and the fluid that leaked to an outside of the high pressure tank through an inside of the supply/discharge hole is stored in a first storage part, and a second fluid as the fluid that leaked from an outside of the supply/discharge hole to the outside of the high pressure tank is stored in a second storage part provided independently from the first storage part, and the method determines that leakage due to abnormality has occurred in the high pressure tank device in a case where the first fluid is detected in the first storage part.

In the method of detecting leakage in the high pressure tank device, by detecting the first fluid stored in the first storage part separately from the second fluid, it is possible to avoid erroneous detection that leakage has occurred due to abnormality, during normal operation of the high pressure tank device. Therefore, it is possible to highly accurately detect leakage due to abnormality occurring in the high pressure tank device.

Preferably, in the above method of detecting leakage in the high pressure tank device, the method determines that the leakage due to abnormality has occurred in the high pressure tank device in a case where a concentration of the second fluid inside the second storage part in excess of a predetermined concentration is detected. As described above, the second fluid may include fluid that leaked due to abnormality occurring in the high pressure tank device. In the second fluid, the quantity of the fluid leaking during normal operation of the high pressure tank device is limited. Therefore, when the concentration of the second fluid exceeds a predetermined concentration, it is possible to determine that leakage has occurred due to abnormality in the high pressure tank device. As a result, it becomes possible to further accurately detect leakage of the fluid due to abnormality.

Preferably, in the above method of detecting leakage in the high pressure tank device, the method determines that the fluid has leaked in the high pressure tank device in a case where a concentration of the second fluid inside the second storage part in excess of a predetermined concentration continuously for a predetermined period of time is detected. In the second fluid, the leakage of fluid during normal operation of the high pressure tank device occurs temporarily. Therefore, it becomes possible to determine that leakage due to abnormality in the high pressure tank device has occurred in the case where the concentration of the second fluid has exceeded a predetermined concentration continuously for a predetermined period of time. As a result, it is possible to further accurately detect the leakage of fluid due to abnormality.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a high pressure tank device and a method of detecting leakage in the high pressure tank device according to the present invention will be described in detail with reference to the accompanying drawings.

The high pressure tank device according to the present invention is, e.g., mounted in a fuel cell vehicle. The high pressure tank device can be used suitably for storing a hydrogen gas to be supplied to the fuel cell system. Although the embodiment of the present invention will be described in connection with a case in which the high pressure tank stores hydrogen gas as a fluid to be supplied to the fuel cell system, the present invention is not limited in this respect. The high pressure tank device according to the present invention need not necessarily be mounted in a fuel cell vehicle, and may store a fluid other than hydrogen gas.

Figure 1:
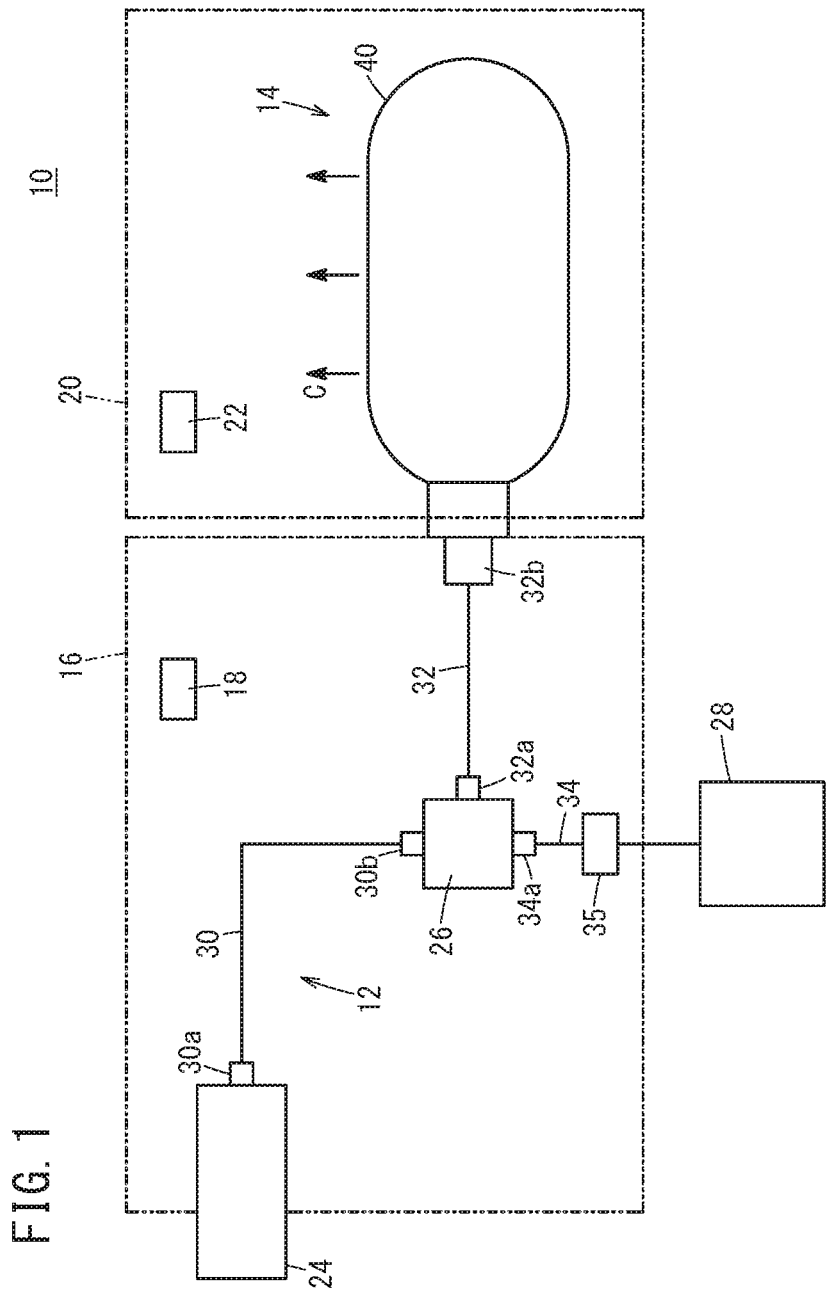
FIG. 1 is a diagram schematically showing the structure of a high pressure tank device according to an embodiment of the present invention.

As shown in FIG. 1, a high pressure tank device 10 according to this embodiment includes a high pressure tank 14 for supplying/discharging hydrogen gas through a supply/discharge channel 12, a first storage part 16, a leakage detection sensor 18, a second storage part 20, and a concentration sensor 22 as main components.

For example, the supply/discharge channel 12 is capable of supplying the hydrogen gas supplied from a filling port 24 to the high pressure tank 14 through a branch channel 26, and supplying the hydrogen gas discharged from the high pressure tank 14 to a regulator 35 through the branch channel 26, regulating the pressure, and then supplying the hydrogen to a fuel cell system 28. In this case, the supply/discharge channel 12 is made up of a pipe 30 connecting the filling port 24 and the branch channel 26, a pipe 32 connecting the branch channel 26 and the high pressure tank 14, and a pipe 34 connecting the branch channel 26 and the fuel cell system 28 through the regulator 35.

A connector part 30a for connection with the filling port 24 is provided at one end of the pipe 30, and a connector part 30b for connection with the branch channel 26 is provided at the other end of the pipe 30. A connector part 32a for connection with the branch channel 26 is provided at one end of the pipe 32, and a connector part 32b for connection with the high pressure tank 14 is provided at the other end of the pipe 32. A connector part 34a for connection with the branch channel 26 is provided at one end of the pipe 34. Each of the connector parts 30a, 30b, 32a, 32b, 34a is formed in an air tight manner so that no leakage of the hydrogen gas occurs during normal operation of the high pressure tank device 10.

Figure 2:
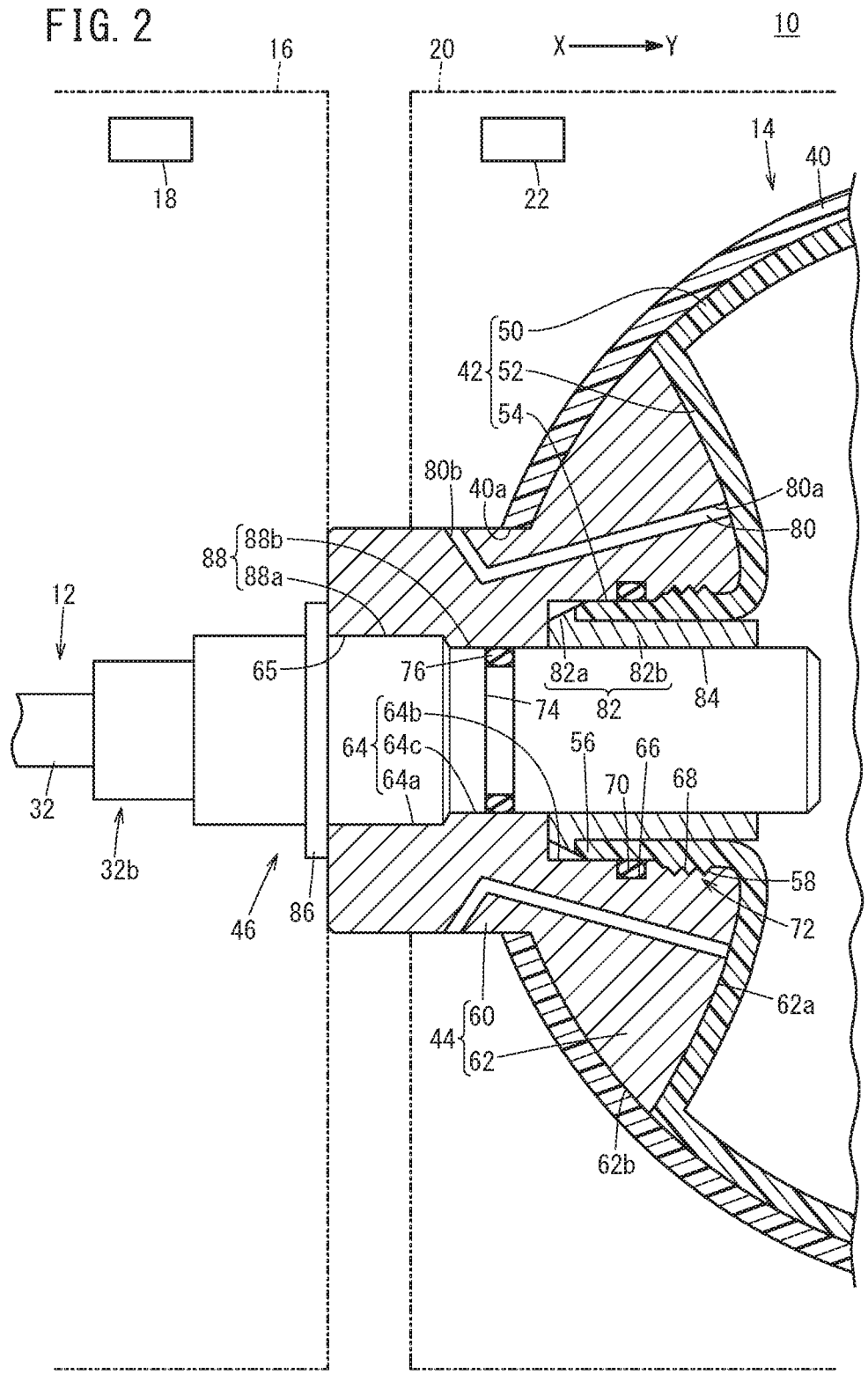
FIG. 2 is a cross sectional view showing main components of the high pressure tank device in FIG. 1.

As shown in FIG. 2, the high pressure tank 14 includes a reinforcement layer 40 of fiber reinforced plastic etc., a liner 42, a cap 44, and an insert member 46, as main components. The liner 42 is a hollow body made of resin. The hydrogen gas can be stored in the liner 42. Specifically, the liner 42 includes a body 50 having an outer surface covered with the reinforcement layer 40, a depressed part 52 which is depressed toward the inside of the body 50, a tubular part 54 protruding from the depressed part 52 outwardly from the body 50. A thin portion 56 is provided at the protruding end of the tubular part 54 (in the direction X indicated by the arrow in FIG. 2). A male screw 58 is provided on the tubular part 54 on one side of the thin portion 56 closer to the proximal end (in the direction Y indicated by the arrow in FIG. 2).

For example, the cap 44 is made of metal, and externally fitted to the tubular part 54 of the liner 42. Further, the cap 44 includes a tubular protrusion 60 and a shoulder 62 expanded from the proximal end of the protrusion 60 outwardly in the radial direction. A supply/discharge hole 64 penetrates the cap 44 along an axis of the protrusion 60. The end surface of the shoulder 62 opposite to the protrusion 60 (in the direction Y indicated by the arrow in FIG. 2) is a liner facing surface 62a which faces the outer surface of the depressed part 52 of the liner 42. Further, a circumferential surface 62b of the shoulder 62 close to the protrusion 60 (on the side in the direction X indicated by the arrow in FIG. 2) is covered with the reinforcement layer 40.

That is, both of the body 50 of the liner 42 and the circumferential surface 62b of the shoulder 62 are covered with the reinforcement layer 40. Further, the protrusion 60 of the cap 44 is exposed and protrudes from an opening 40a of the reinforcement layer 40. At least part of the outer circumferential surface of the protrusion 60 faces the inside of the second storage part 20.

The diameter of the supply/discharge hole 64 varies depending on the position. The supply/discharge hole 64 includes an intermediate inner diameter hole 64a positioned closer to the protrusion 60 in the axial direction, a large inner diameter hole 64b positioned closer to the shoulder 62, and a small inner diameter hole 64c provided between the intermediate inner diameter hole 64a and the large inner diameter hole 64b.

The tubular part 54 is inserted into the large inner diameter hole 64b. In the structure, the outer circumferential surface of the tubular part 54 is provided along the inner circumferential surface of the large inner diameter hole 64b. That is, it is possible to supply the hydrogen gas into the liner 42 from the intermediate inner diameter hole 64a and the small inner diameter hole 64c of the supply/discharge hole 64 through the inside of the tubular part 54. Further, it is possible to discharge the hydrogen gas inside the liner 42 through the inside of the tubular part 54 and the small inner diameter hole 64c and the intermediate inner diameter hole 64a of the supply/discharge hole 64.

Therefore, the direction from the distal end of the tubular part 54 to its proximal end is oriented in the gas supply direction in which the hydrogen gas is supplied into the liner 42 (in the direction indicated by the arrow from X to Y in FIG. 2). In other words, the direction from the proximal end to the distal end of the tubular part 54 is oriented in the gas discharge direction in which the hydrogen gas stored in the liner 42 is discharged.

The inner diameter of the large inner diameter hole 64b has a size in correspondence with the outer diameter of the tubular part 54. Specifically, in the large inner diameter hole 64b, the inner diameter at a position facing the thin portion 56 is smaller than the inner diameter at a position facing the proximal end side of the thin portion 56. Further, in the inner wall of the large inner diameter hole 64b, an annular first seal groove 66 is formed along the circumferential direction of the large inner diameter hole 64b, at a position facing the thin portion 56 of the tubular part 54, and a female screw 68 is formed at a position facing the male screw 58 of the tubular part 54 and screwed with the male screw 58.

A first seal member 70 is provided in the first seal groove 66. The first seal member 70 is an O-ring. The distance between the inner wall surface of the first seal groove 66 and the outer circumferential surface of the thin portion 56 (a seal gap) is determined in a manner that the first seal member 70 is kept compressed between the inner wall surface of the first seal groove 66 and the outer circumferential surface of the thin portion 56. In the structure, the gap between the outer circumferential surface of the tubular part 54 and the inner circumferential surface of the supply/discharge hole 64 is sealed. A joint portion 72 is formed downstream of the first seal groove 66 in the gas supply direction (indicated by the arrow Y in FIG. 2). At the joint portion 72, the male screw 58 and the female screw 68 are screw engaged with each other to join the outer circumferential surface of the tubular part 54 and the inner circumferential surface of the large inner diameter hole 64b.

Further, a passage 80 is formed in the cap 44. A first opening 80a is formed at one end of the passage 80. The first opening 80a is opened in the liner facing surface 62a of the cap 44. Further, a second opening 80b is provided at the other end of the passage 80. The second opening 80b is opened in the outer circumferential surface of the protrusion 60 which is exposed from the opening 40a of the reinforcement layer 40, and faces the inside of the second storage part 20. In the structure, the passage 80 connects the portion (covered portion) between the outer surface of the liner 42 and the reinforcement layer 40 to the second storage part 20. It should be noted that a single passage 80 may be provided for the cap 44, or a plurality of passages 80 may be provided at certain intervals (spaces) in the circumferential direction of the cap 44.

A collar 82 is provided inside the large inner diameter hole 64b and supports the tubular part 54. For example, the collar 82 is made of metal. The collar 82 includes an annular collar head part 82a, and a collar cylindrical part 82b in the form of a cylinder provided integrally with the collar head part 82a. Further, a through hole 84 penetrates the collar 82 along the axis of the collar cylindrical part 82b. The collar cylindrical part 82b is inserted into the tubular part 54, and thus the through hole 84 is formed between the small inner diameter hole 64c of the supply/discharge hole 64 and the inside of the liner 42.

Further, the outer circumferential surface of the collar cylindrical part 82b is disposed along the inner circumferential surface of the large inner diameter hole 64b through the tubular part 54. That is, the tubular part 54 is held between the outer circumferential surface of the collar cylindrical part 82b and the inner circumferential surface of the large inner diameter hole 64b. In this regard, from the viewpoint of holding the tubular part 54 more suitably to maintain the seal gap, preferably, the collar cylindrical part 82b is press fitted into the tubular part 54.

The insert member 46 includes a head part 86 and an insert part 88 which can be inserted into the supply/discharge hole 64. The diameter of the head part 86 is larger than the diameter of the intermediate inner diameter hole 64a (an opening 65 of the supply/discharge hole 64). The insert part 88 is inserted into the supply/discharge hole 64. Thus, the head part 86 closes the opening 65 of the supply/discharge hole 64. Further, the pipe 32 is inserted into the insert member 46 through the connector part 32b provided adjacent to the head part 86 of the insert member 46, and a valve etc. (not shown) for opening/closing the pipe 32 is provided in the insert member 46.

The insert part 88 includes a large diameter portion 88a corresponding to the diameter of the intermediate inner diameter hole 64a, and a small diameter portion 88b corresponding to the diameters of the small inner diameter hole 64c and the through hole 84. The large diameter portion 88a is inserted into the intermediate inner diameter hole 64a in a manner that the circumferential surface of the large diameter portion 88a contacts the inner circumferential surface of the intermediate inner diameter hole 64a. The small diameter portion 88b is inserted into the small inner diameter hole 64c and the through hole 84 in a manner that the circumferential surface of the small diameter portion 88b contacts the inner circumferential surfaces of the small inner diameter hole 64c and the through hole 84.

Further, an annular second seal groove 74 is formed along the circumferential direction of the outer wall of the small diameter portion 88b, and a second seal member 76 is provided inside the second seal groove 74. The second seal member 76 is an O-ring. The second seal groove 74 faces the inner circumferential surface of the small inner diameter hole 64c, and the seal gap as the distance between the inner wall surface of the second seal groove 74 and the inner circumferential surface of the small inner diameter hole 64c is determined in a manner that the second seal member 76 is kept compressed between the inner wall surface of the second seal groove 74 and the inner circumferential surface of the small inner diameter hole 64c. The gap between the outer circumferential surface of the insert part 88 and the inner circumferential surface of the supply/discharge hole 64 is thus sealed.

As shown in FIGS. 1 and 2, the first storage part 16 is formed by the walls surrounding the supply/discharge channel 12 including the above connector parts 30a, 30b, 32a, 32b, 34a, the branch channel 26, etc., and the opening 65 of the supply/discharge hole 64. In the structure, the first storage part 16 can store the first fluid. For example, the first fluid is at least one of the hydrogen gas A that leaked from the supply/discharge channel 12 as indicated by the arrows A in FIG. 3 and the hydrogen gas B that leaked to the outside of the high pressure tank 14 through the inside of the supply/discharge hole 64 as indicated by the arrow B in FIG. 3.

Leakage of the hydrogen gas A from the supply/discharge channel 12 occurs due to loosening of at least one of the connector parts 30a, 30b, 32a, 32b, 34a. Further, leakage of the hydrogen gas B through the inside of the supply/discharge hole 64 occurs due to problems of the second seal member 76. That is, the first fluid is a hydrogen gas that leaked due to occurrence of abnormality of the high pressure tank device 10 at a position which is intended not to cause leakage of the hydrogen gas during normal operation of the high pressure tank device 10.

The leakage detection sensor 18 is provided inside the first storage part 16, and detects the hydrogen gas in the first storage part 16. As the leakage detection sensor 18, any of various types of hydrogen sensors may be used as long as it can detect the presence/absence of leakage of the hydrogen gas or the leaked quantity (concentration) of the hydrogen gas.

The second storage part 20 is provided independently of the first storage part 16, and formed by the wall surrounding from the proximal end of the protrusion 60 including the second opening 80b of the passage 80 to the end of the high pressure tank 14 on the downstream side in the gas supply direction. In the structure, the second storage part 20 can store the hydrogen gas as the second fluid that leaked out of the high pressure tank 14 from the outside of the supply/discharge hole 64.

Examples of the second fluid include the following hydrogen gases. Specifically, firstly, as indicated by the arrows C in FIG. 1, the second fluid includes a leaked hydrogen gas C which passed through both of the liner 42 and the reinforcement layer 40 from the inside of the high pressure tank 14. Next, as indicated by the arrow D1 in FIG. 3, the second fluid includes a hydrogen gas D1 which passed through the liner 42 to enter the covered portion and leaked through the passage 80. Further, as indicated by the arrow D2 in FIG. 3, the second fluid includes a hydrogen gas D2 which leaked from the opening 40a through the gap between the circumferential surface 62b of the shoulder 62 and the reinforcement layer 40 instead of through the passage 80.

Figure 4:
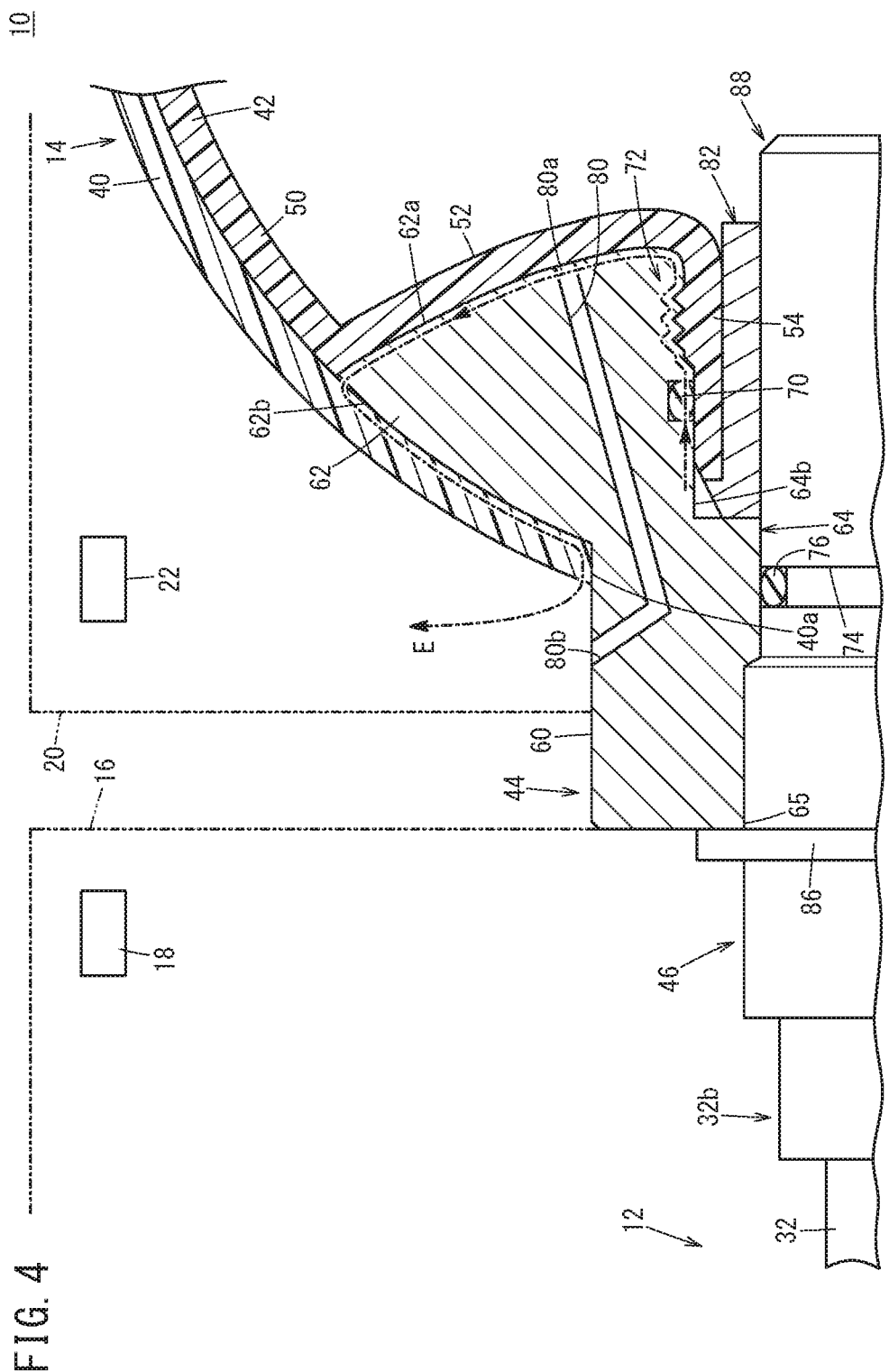
FIG. 4 is a view illustrating a hydrogen gas E contained in the second fluid when abnormality occurs in the high pressure tank device.

Lastly, as indicated by the arrow E in FIG. 4, the second fluid includes a hydrogen gas E which leaked due to, e.g., a trouble of the first seal member 70, through the supply/discharge hole 64, the gap between the outer circumferential surface of the tubular part 54 and the inner circumferential surface of the large inner diameter hole 64b, the gap between the outer surface of the depressed part 52 and the liner facing surface 62a, the gap between the circumferential surface 62b of the shoulder 62 and the reinforcement layer 40, and then through the opening 40a of the reinforcement layer 40.

Among these hydrogen gases, the hydrogen gases C, D1, D2 leak temporarily, or in limited quantities, during normal operation of the high pressure tank device 10. In contrast, the hydrogen gas E is a hydrogen gas which leaked due to abnormality occurring in the high pressure tank device 10 at a position which is intended not to cause leakage of the hydrogen gas during normal operation of the high pressure tank device 10.

The concentration sensor 22 is provided inside the second storage part 20, and detects the concentration of the hydrogen gas inside the second storage part 20.

The high pressure tank device 10 according to the embodiment basically has the above structure. Hereafter, a method of detecting the leakage in the high pressure tank device 10 will be described. During normal operation of the high pressure tank device 10, for example, as shown in FIG. 1, the hydrogen gas supplied from a hydrogen supply source (not shown) through the filling port 24 to the supply/discharge channel 12 is supplied into the high pressure tank 14 through the pipe 30, the branch channel 26, the pipe 32, and the above-mentioned valve provided in the insert member 46. In the case where the hydrogen gas is fully filled in the high pressure tank 14 by the supply of the gas in this manner, a switching valve etc. (not shown) of the supply/discharge channel 12 is operated. The hydrogen gas in the high pressure tank 14 is discharged into the pipe 32 through the above-mentioned valve provided in the insert member 46. After the pressure of the hydrogen gas is regulated by the regulator 35, the hydrogen gas is supplied to the fuel cell system 28 through the pipe 34.

By supplying the hydrogen gas as described above, when the pressure in the high pressure tank 14 is high, i.e., when the filling pressure of the hydrogen gas is large, the hydrogen gas inside the high pressure tank 14 can pass through the liner 42 easily. As shown in FIG. 1, in the case where the hydrogen gas which passed through the liner 42 also passed through the reinforcement layer 40, the hydrogen gas is stored in the second storage part 20 as the hydrogen gas C (second fluid). Further, as shown in FIG. 3, in the case where the hydrogen gas passed through the liner 42 into the covered portion and moved, the hydrogen gas is stored as the hydrogen gasses D1, D2 (second fluid) in the second storage part 20.

Figure 3:
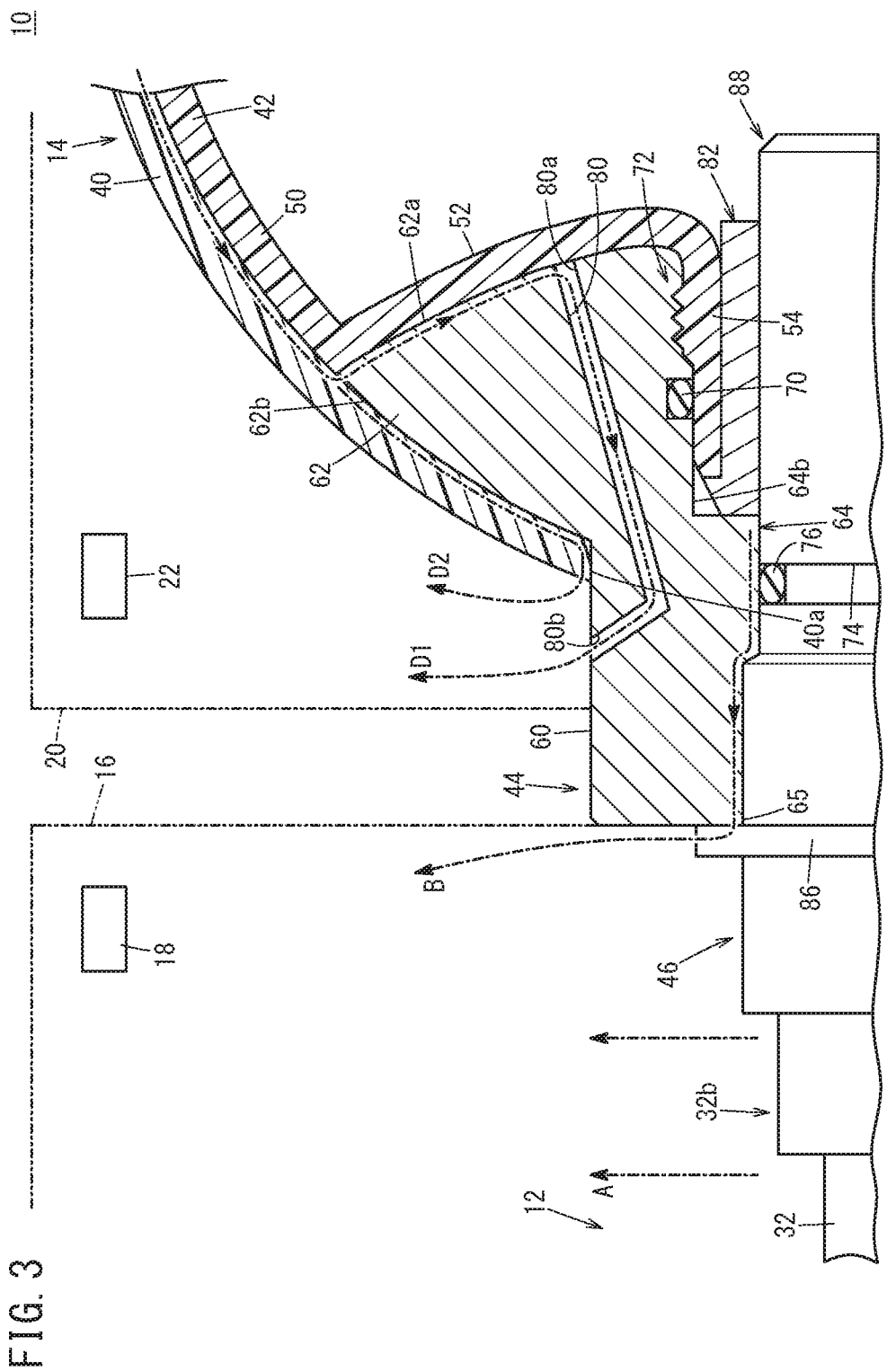
FIG. 3 is a view illustrating a first fluid (hydrogen gases A, B) and a second fluid (hydrogen gases D1, D2) stored respectively in a first storage part and a second storage part.

On the other hand, for example, in the case where at least one of the connector parts 30a, 30b, 32a, 32b, 34a has loosened, or a trouble has occurred in the second seal member 76 to cause abnormality in the high pressure tank device 10, as shown in FIG. 3, leakage of the hydrogen gas A from the connector part 32b, etc. occurs, and leakage of the hydrogen gas B from the inside of the supply/discharge hole 64 occurs. These hydrogen gases A, B are stored in the first storage part 16 as the first fluid.

That is, in the high pressure tank device 10, it is possible to separately store the second fluid which can be leaked as a part of normal operation and the first fluid which must be detected as abnormal leakage.

Since the first fluid which does not include the second fluid is stored in the first storage part 16, the leakage detection sensor 18 provided in the first storage part 16 does not detect the second fluid. Therefore, it is possible to avoid erroneous detection that leakage has occurred due to abnormality, during normal operation of the high pressure tank device 10. As a result, it is possible to highly accurately detect leakage occurring due to abnormality in the high pressure tank device 10.

The second fluid which leaked from the outside of the supply/discharge hole 64 and stored in the second storage part 20 may include, as shown in FIG. 4, the hydrogen gas E which leaked due to troubles in the first seal member 70, in addition to the hydrogen gases C, D1, D2. By providing the concentration sensor 22 inside the second storage part 20, it is possible to detect the hydrogen gas E when the hydrogen gas E is stored in the second storage part 20. Thus, it is possible to further accurately detect leakage due to abnormality occurring in the high pressure tank device 10.

Figure 5:
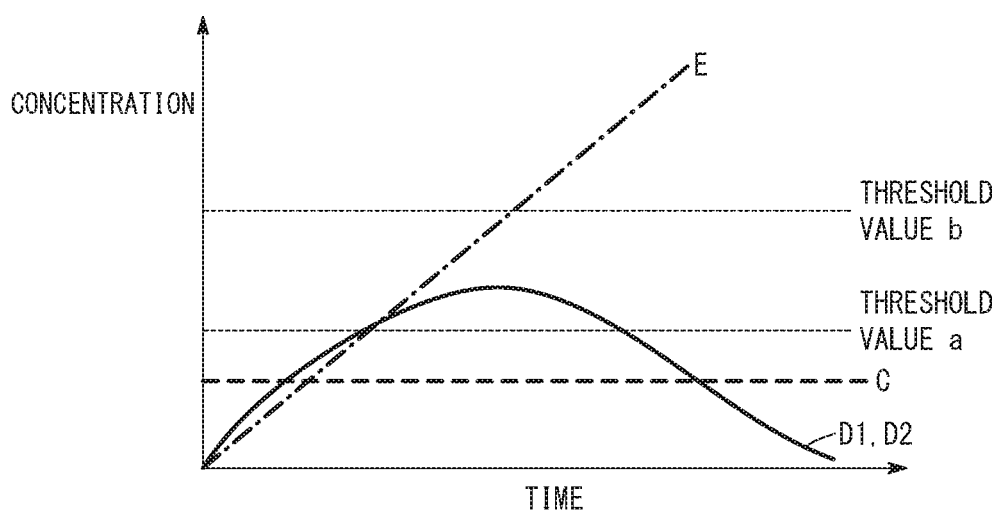
FIG. 5 is a graph in which the horizontal axis shows the duration time of leakage and the vertical axis shows the concentration in the second storage part for the hydrogen gas C, the hydrogen gases D1, D2, and the hydrogen gas E.

In this regard, FIG. 5 is a graph in which the horizontal axis shows the duration time of leakage and the vertical axis shows the concentration inside the second storage part 20 for each of the hydrogen gas C, the hydrogen gasses D1, D2, and the hydrogen gas E. As shown by the bold broken line in FIG. 5, the quantity of the leaked hydrogen gas C is small and limited. Therefore, the concentration of the hydrogen gas C which leaked into the second storage part 20 does not exceed a threshold value a.

As shown by the solid line in FIG. 5, the quantity of the leaked hydrogen gases D1, D2 is limited, and the leakage occurs temporarily. Therefore, the concentration of the hydrogen gases D1, D2 leaked in the second storage part 20 exceeds the threshold a temporarily but does not exceed a threshold b.

In contrast, as shown by the one dot chain line in FIG. 5, the leakage of the hydrogen gas E continues until the problem of the first seal member 70 is solved, or until the filling pressure of the hydrogen gas in the high pressure tank 14 becomes significantly small. As long as this leakage continues, the concentration of the hydrogen gas E in the second storage part 20 increases, and exceeds the threshold values a, b, continuously.

Thus, for example, in the case where the concentration of the hydrogen gas inside the second storage part 20 detected by the concentration sensor 22 exceeds the threshold value b, it is possible to determine that the second fluid contains the hydrogen gas E, i.e., the leakage is occurring due to abnormality in the high pressure tank device 10.

Further, in the same way, in the case where the concentration of hydrogen gas inside the second storage part 20 detected by the concentration sensor 22 exceeds the threshold value a continuously for a predetermined period (a determination period), it is possible to determine that the leakage is occurring due to abnormality in the high pressure tank device 10. The thresholds a, b, and the determination period can be determined by previously measuring the amounts, rates, etc. of leakages of hydrogen gas in the high pressure tank device 10 in the normal condition and abnormal condition.

In the high pressure tank device 10, since the passage 80 connecting the covered portion and the second storage part 20 is provided, it is possible to suitably guide the hydrogen gas entering the covered portion into the second storage part 20 through the passage 80. Thus, it is possible to effectively suppress stagnation of the hydrogen gas in the covered portion. Accordingly, even when the hydrogen gas in the liner 42 is discharged, it is possible to prevent the pressure in the liner 42 from becoming lower than the pressure in the covered portion. Consequently, it is possible to avoid so called buckling where the liner 42 is partly detached from the reinforcement layer 40, and/or the portion of the liner 42 detached from the reinforcement layer 40 expands inwardly in the liner 42. Accordingly, it is possible to improve the durability of the high pressure tank 14.

The present invention is not limited to the above described embodiment. Various modifications can be made without departing from the gist of the present invention.

In the high pressure tank device 10 according to the above embodiment, the first storage part 16 is formed by the walls surrounding the entirety of the supply/discharge channel 12 and the opening 65 of the supply/discharge hole 64. Further, the second storage part 20 is formed by the walls surrounding the entirety from the proximal side of the protrusion 60 including the second opening 80b of the passage 80 to the end of the high pressure tank 14 on the downstream in the gas supply direction. However, the present invention is not limited specifically to these designs, as long as the first storage part 16 and the second storage part 20 can store the first fluid and the second fluid, respectively.

For example, as described above, in the case where the first storage part and the second storage part store hydrogen gas as the first fluid and the second fluid, the hydrogen gas is lighter than the air, and moves upward vertically. Therefore, the first storage part 16 should surround at least the upper part of the supply/discharge channel 12 and the opening 65 in the vertical direction. Likewise, the second storage part 20 should surround at least the upper part of the high pressure tank 14 in the vertical direction.

Further, for example, as described above, in the case where the high pressure tank device 10 is mounted in a fuel cell vehicle, the floor panel of the fuel cell vehicle may be used as the second storage part 20. In this case, the first storage part 16 may be provided inside the second storage part 20 in a manner that the internal space of the second storage part 20 and the internal space of the first storage part 16 do not communicate with each other. This makes it possible to simplify the high pressure tank device 10 by using existing structure.

Although, in the above-described embodiment, the high pressure tank device 10 includes one high pressure tank 14, the high pressure tank device 10 may include a plurality of high pressure tanks 14. In this case, one second storage part 20 may store the second fluid leaking from the plurality of high pressure tanks 14. Alternatively, a plurality of high pressure tanks 14 and the same number of second storage parts 20 may be provided in a manner that the second storage parts 20 store the second fluid respectively for the high pressure tanks 14.

The supply/discharge channel 12 is not limited to the structure made up of components such as the pipes 30, 32, 34, and the branch channel 26. The supply/discharge channel 12 may adopt any of various structures capable of supplying/discharging hydrogen gas (fluid) to/from the high pressure tank 14.

What is claimed is:

1. A high pressure tank device comprising a high pressure tank configured to supply/discharge a fluid through a supply/discharge channel,
   the high pressure tank comprising a resin liner configured to store the fluid inside, a reinforcement layer configured to cover an outer surface of the liner, and a cap including a supply/discharge hole formed inside and configured to supply/discharge the fluid to/from the liner,
   the high pressure tank device further comprising,
   a first storage part configured to store a first fluid, wherein the first fluid is a portion of the fluid leaking to an outside of the high pressure tank from at least one of the supply/discharge channel and an inside of the supply/discharge hole,
   a leakage detection sensor provided in the first storage part and configured to detect leakage of the first fluid, and
   a second storage part provided independently from the first storage part, and configured to store a second fluid, wherein the second fluid is another portion of the fluid leaking to the outside of the high pressure tank from an outside of the supply/discharge hole.

2. The high pressure tank device according to claim 1, wherein the cap includes a liner facing surface configured to face an outer surface of the liner, an outer circumferential surface configured to face an inside of the second storage part, and a passage opening in the liner facing surface and the outer circumferential surface and configured to connect a gap between the outer surface of the liner and the reinforcement layer, and the second storage part.

3. The high pressure tank device according to claim 1, further comprising a concentration sensor provided inside the second storage part, and configured to detect a concentration of the second fluid.

4. A method of detecting leakage of a fluid in a high pressure tank device configured to supply/discharge the fluid to/from a high pressure tank through a supply/discharge channel, the high pressure tank comprising a resin liner configured to store the fluid inside, a reinforcement layer configured to cover an outer surface of the liner, and a cap including a supply/discharge hole formed inside and configured to supply/discharge the fluid to/from the liner, the method comprising:
   storing a first fluid in a first storage part of the high pressure tank device, wherein the first fluid is a portion of the fluid leaking to an outside of the high pressure tank from at least one of the supply/discharge channel and an inside of the supply/discharge hole,
   storing a second fluid in a second storage part of the high pressure tank device provided independently from the first storage part, wherein the second fluid is another portion of the fluid leaking to the outside of the high pressure tank from an outside of the supply/discharge hole, and
   determining that leakage due to an abnormality has occurred in the high pressure tank device based on the first fluid being detected in the first storage part by a leakage detection sensor.

5. The method of detecting leakage in the high pressure tank device according to claim 4, wherein the method determines that the leakage due to the abnormality has occurred in the high pressure tank device based on a detection that a concentration of the second fluid inside the second storage part is in excess of a predetermined concentration.

6. The method of detecting leakage in the high pressure tank device according to claim 4, wherein the method determines that the fluid has leaked in the high pressure tank device based on a detection that a concentration of the second fluid inside the second storage part is in excess of a predetermined concentration continuously for a predetermined period of time.

* * * * *